United States Patent
Suzuki

(10) Patent No.: US 11,162,472 B2
(45) Date of Patent: Nov. 2, 2021

(54) ROTOR BLADE

(71) Applicant: NTN CORPORATION, Osaka (JP)

(72) Inventor: Masahiko Suzuki, Hamamatsu (JP)

(73) Assignee: NTN CORPORATION, Osaka (JP)

( * ) Notice: Subject to any disclaimer, the term of this patent is extended or adjusted under 35 U.S.C. 154(b) by 133 days.

(21) Appl. No.: 16/078,823

(22) PCT Filed: Dec. 7, 2016

(86) PCT No.: PCT/JP2016/086362
§ 371 (c)(1),
(2) Date: Aug. 22, 2018

(87) PCT Pub. No.: WO2017/145488
PCT Pub. Date: Aug. 31, 2017

(65) Prior Publication Data
US 2019/0055918 A1 Feb. 21, 2019

(30) Foreign Application Priority Data

Feb. 24, 2016 (JP) .............................. JP2016-033037

(51) Int. Cl.
*F03D 1/06* (2006.01)
(52) U.S. Cl.
CPC .............. *F03D 1/0633* (2013.01); *F03D 1/06* (2013.01); *F03D 1/0641* (2013.01);
(Continued)
(58) Field of Classification Search
CPC ........ F03D 1/0633; F03D 1/06; F03D 1/0641; F03D 1/0675; F05B 2240/221;
(Continued)

(56) References Cited

U.S. PATENT DOCUMENTS 8,128,338 B2 * 3/2012 Suzuki .................... B64C 11/18
415/4.3
8,241,002 B2 * 8/2012 Wobben ................ F03D 1/0675
416/228

(Continued)

FOREIGN PATENT DOCUMENTS

EP 1832744 A1 9/2007
JP 2006-152957 A 6/2006
(Continued)

OTHER PUBLICATIONS

Machine Translation of JP2006257886 [retrieved on Feb. 25, 2020], Retrieved from: Espacenet. (Year: 2020).*

(Continued)

*Primary Examiner* — J. Todd Newton
*Assistant Examiner* — Eric J Zamora Alvarez
(74) *Attorney, Agent, or Firm* — Finch & Maloney, PLLC; Michael J. Bujold; Jay S. Franklin

(57) ABSTRACT

A lift type rotor blade which has a chord length gradually increased from a blade root to a maximum chord length portion being a base portion of a blade end portion, includes a leading edge, a front surface and an inclined portion formed on the blade end portion. The leading edge has a maximum thickness that is the maximum at the blade root and is gradually and continuously decreased from the blade root to a tip portion via the maximum chord length portion in a side view. The front surface is gradually inclined in a direction of a back surface from the blade root to the maximum chord length portion such that an interval between the front and back surfaces is continuously decreased. The inclined portion is inclined in a front surface direction from the maximum chord length portion.

9 Claims, 9 Drawing Sheets

(52) U.S. Cl.
CPC ... *F05B 2240/221* (2013.01); *F05B 2240/231* (2013.01); *F05B 2250/292* (2013.01); *F05B 2250/71* (2013.01); *Y02E 10/72* (2013.01)

(58) Field of Classification Search
CPC .......... F05B 2240/231; F05B 2250/292; F05B 2250/71; F05B 2240/301; F05B 2240/30; Y02E 10/721; Y02E 10/722; F01D 5/30; F04D 29/284; F04D 29/388
See application file for complete search history.

(56) References Cited

U.S. PATENT DOCUMENTS

| | | | |
|---|---|---|---|
| 8,371,819 B2 * | 2/2013 | Suzuki | B63H 1/14 |
| | | | 416/228 |
| 2008/0093860 A1 | 4/2008 | Suzuki | |
| 2015/0132130 A1 * | 5/2015 | Brown | F03D 17/00 |
| | | | 416/43 |
| 2015/0233344 A1 * | 8/2015 | Lee | F03D 1/0633 |
| | | | 416/223 R |

FOREIGN PATENT DOCUMENTS

| | | | |
|---|---|---|---|
| JP | 2006-257886 A | 9/2006 | |
| JP | 2008-196425 A | 8/2008 | |
| JP | 2012-132335 A | 7/2012 | |
| JP | 5296141 B2 * | 9/2013 | .......... F03D 1/0633 |
| JP | 2012-233445 A | 2/2017 | |
| WO | 2012150691 A1 | 11/2012 | |

OTHER PUBLICATIONS

Machine Translation of JP5296141 [retrieved on Feb. 25, 2020]. Retrieved from: Espacenet. (Year: 2020).*
International Search Report Corresponding to PCT/JP2016/086362 dated Feb. 21, 2017.
Written Opinion Corresponding to PCT/JP2016/086362 dated Feb. 21, 2017.
European Office Action issued in corresponding European Patent Application No. 16 891 644.3 dated Nov. 12, 2020.

* cited by examiner

ROTOR BLADE

FIELD OF THE INVENTION

The present invention relates to a rotor blade which has a high efficiency and is suitable for wind power generation, wherein the rotor blade is obtained by optimizing dimensions of a horizontal-shaft-type rotor blade.

BACKGROUND OF THE INVENTION

A rotor blade of which a chord length of its tip portion is lengthened is disclosed in JP 2006-152957 A and JP 2008-196425 A.

SUMMARY OF THE INVENTION

The blades described in JP 2006-152957 A and JP 2008-196425 A have each chord length of their blade end portions larger than respective chord lengths of their blade roots, but each of the chord lengths is not within a range of 40 to 50% of their respective rotation radiuses. Moreover, each front surface of the blades is parallel to their respective back surfaces. Therefore, resistance tends to increase when a wind speed is low.

An object of the present invention is to provide a rotor blade (it is simply referred to as "blade" below) of which a rotational resistance is low. As a result of repeating experiments, it is found that making a maximum chord length of a blade within a range of 40 to 50% of its rotation radius is effective.

Specifics of the present invention are as follows.

(1) A rotor blade which is a lift type blade having a chord length gradually increased from a blade root to a blade end portion, comprising:
a leading edge of which a maximum thickness is gradually decreased from the blade root to the blade end portion in a side view;
a front surface gradually inclined in a direction of a back surface from the blade root to a maximum chord length portion; and
an inclined portion formed of a blade end portion which is inclined in a front surface direction from the maximum chord length portion,
wherein an airflow is directed from the blade root to the maximum chord length portion at where an air pressure is decreased when rotating.

(2) The rotor blade according to the above item (1), wherein the front surface of the lift type blade is gradually inclined in the direction of the back surface from the blade root to the blade end portion, and a backward portion behind a width center line of a chord of the lift type blade is gradually shifted to the direction of the front surface from the blade root to the blade end portion.

(3) The rotor blade according to the above item (1) or (2), wherein thickness of the blade root is 300% plus or minus 10% of thickness of the maximum chord length portion, wherein the blade end portion is the inclined portion inclined in the direction of the front surface from a front surface of the maximum chord length portion, and wherein airflows gathering to the blade root due to a difference among high-speed flows on the front surface by Coanda effect when rotating are naturally directed to the inclined portion.

(4) The rotor blade according to any one of the above items (1) to (3), wherein the lift type blade is fixed to a hub of a rotor at an attack angle of 0 degree.

(5) The rotor blade according to any one of the above items (1) to (4), wherein the maximum chord length of the blade end portion is within a range of 40 to 50% of a rotation radius, a chord length of the blade root on the front surface is within a range of 30 to 35% of the maximum chord length, the thickness in a side surface of the blade root is within a range of 72 to 76% of the chord length of the blade root, and thickness of the blade end portion is within a range of 30 to 35% of the thickness of the blade root.

According to the present invention, the following advantages can be obtained.

In the invention according to the above item (1): the maximum thickness of the leading edge of the blade end portion of the rotor blade is decreased than the thickness of the blade root, and the front surface is inclined in the direction of the back surface from the blade root in the side view. Therefore, an airflow hitting the front surface when rotating is naturally directed from the blade root in the direction of the blade end portion.

When rotating, a speed of an airflow passing through the front surface in a trailing edge direction by Coanda effect at the blade root of which the maximum thickness of the leading edge is larger than that of the blade end portion is faster than a speed of an airflow passing through the front surface in the trailing edge direction at the blade end portion of which the maximum thickness of the leading edge is thin.

When a difference exists in the thickness of the leading edge, a flow speed by the Coanda effect is faster in the thicker portion, and an air density and an air pressure are decreased than those in the portion of the lower flow speed. Airflows of higher pressure are drawn to the portion at which the air pressure is low from the surroundings.

In other words, in a conventional rotor blade, a low pressure does not tend to occur at the blade root compared to at the blade end portion owing to that a rotational peripheral speed at a blade end portion is faster than that at a blade root. On the other hand, in the rotor blade of the present invention, since the maximum thickness of the leading edge of the blade root is significantly larger than that of the blade end portion, large amounts of airflows in atmospheric pressure are drawn to the vicinity of the blade root from the surroundings when rotating.

When these large amounts of airflows in atmospheric pressure rapidly concentrate to the vicinity of the blade root, the pressure at the blade end portion is comparatively lowered, the airflows in the vicinity of the blade root moves in the direction of the blade end portion due to the air pressure difference at a speed higher than that of airflows of atmospheric pressure, and raises a rotation efficiency by pushing a backward portion of the blade end portion in the rotation direction.

In the invention according to the above item (2): since a forward portion before a width center line of a chord on the front surface of the blade is gradually inclined in the direction of the back surface from the blade root to the blade end portion, the airflow easily moves from the blade root.

Since the backward portion behind the width center line of the chord is gradually shifted to the direction of the front surface from the blade root to the blade end portion, the airflow moving from the blade root raises the rotation efficiency by gradually loading a pressure in the rotation direction to the backward portion of the blade with the same action as the front surface being shifted forward.

In the invention according to the above item (3): since the maximum thickness of the blade root is larger than three times or more of that of the maximum chord length portion, the speed of the passing airflow at the blade root by the Coanda effect when rotating is higher than that at the blade end portion, and the amount of the airflows drawn from the surroundings is increased.

These concentrated airflows move to the inclined portion of the blade end at a speed higher than that of a wind speed, strongly push the inclined portion in the rotation direction, and raise the rotation efficiency.

In the invention according to the above item (4): since the rotor blade is fixed to the hub of the rotor by a small attack angle, resistance is small when rotating. Particularly, since thickness of the blade end portion is set at about one-third of the thickness of the blade root, rotational resistance is small.

Since the maximum thickness of the leading edge of the blade is gradually increased from the blade end portion to the blade root, the flow speed at the blade root at where the rotational peripheral speed is low is raised by the Coanda effect. Accordingly, the large amounts of airflows are concentrated to the blade root, the airflows move to the blade end portion at a speed higher than the wind speed, push the inclined portion in the rotation direction, and raise the rotation efficiency.

In the invention according to the above item (5): since the maximum chord length of the blade end portion is within the range of 40 to 50% of the rotation radius, a wind receiving area can be maximized. Since the chord length of the blade root on the front surface is within the range of 30 to 35% of the maximum chord length, a relative flow from the rotational forward direction can be sufficiently received when rotating.

Since the thickness in the side surface of the blade root is within the range of 72 to 76% of the chord length of the blade root, the flow speed in the chord direction by the Coanda effect can be effectively raised.

Since the thickness of the blade end portion is within the range of 30 to 35% of the thickness of the blade root, the blade is excellent in balance of strength, and the front surface can be inclined by about 2 degrees in the direction of the back surface such that the airflow can easily move from the blade root in a direction of a tip on the front surface.

EMBODIMENTS OF THE INVENTION

Examples according to the present invention are described with the drawings as follows. The drawings show the best shape as a result of repeating experiments, and each numerical value range presents their permissible ranges for altering.

Figure 1:
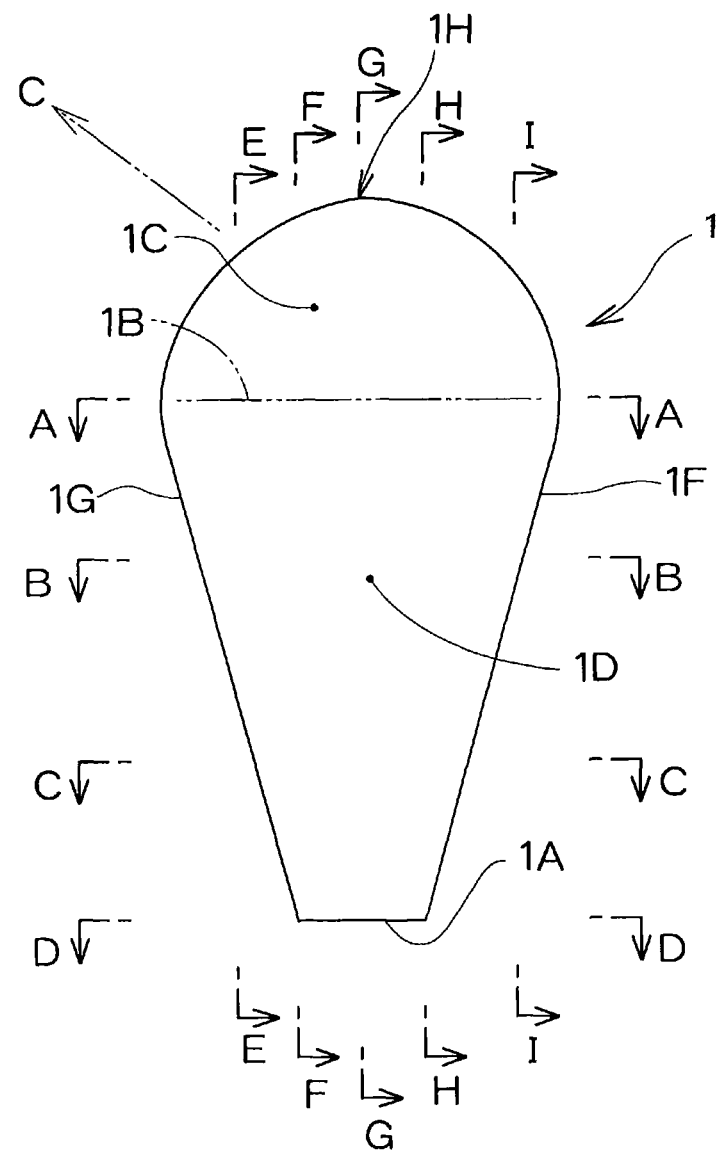
FIG. 1 is a front elevational view of a rotor blade showing an embodiment of the present invention.

In FIG. 1, a rotor blade 1 is a lift type blade (it is simply referred to as "blade" below), and a shape of its front surface is shown in bilateral symmetry. It is also possible to use a rotor blade of which a front surface has an asymmetric shape.

The front surface 1D of the blade 1 has a chord length which is gradually increased from a blade root 1A to a maximum chord length portion 1B, and the chord length at the maximum chord length portion 1B is within a range of 45 to 50% of a rotation radius r (see FIG. 14) of the blade 1.

When the chord length is less than this range, a wind receiving area is small and a rotation efficiency of the lift type blade 1 of which a blade end portion is formed into an inclined portion 1C is difficult to be raised.

When the chord length is more than 50%, the rotation efficiency is difficult to be raised due to an influence of a turbulent flow occurred by a blade 1 fitted to a hub 3 at a forward position in a rotation direction.

A ratio of the chord length of the blade root 1A to that of the maximum chord length portion B on the front surface 1D of the blade 1 is set at about one-third and so on, namely within a range of 30 to 35%.

When the chord length of the blade root 1A is more than this range, a passing property of airflow is lowered when rotating and a passing time is increased. When the chord length is less than this range, a passing speed of the airflow by Coanda effect and strength are decreased.

Figure 2:
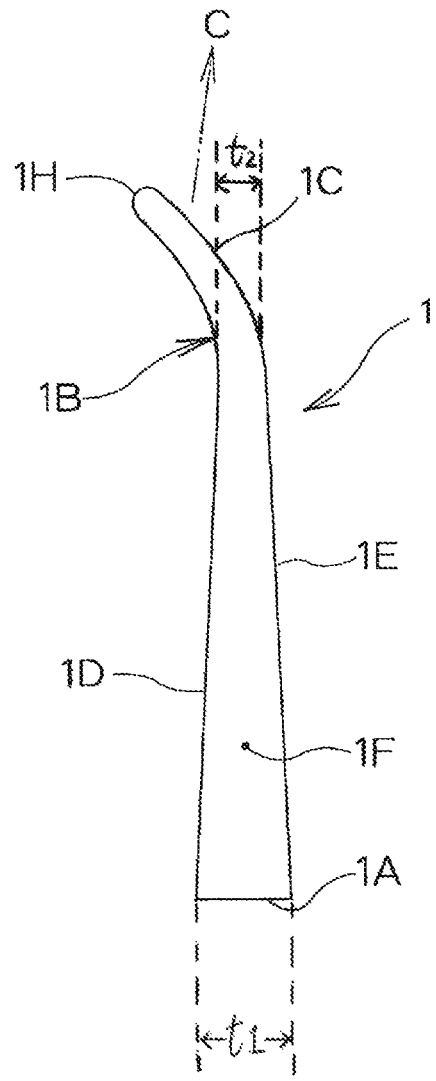
FIG. 2 is a right side elevational view thereof.

As shown in FIG. 2, thickness of the blade 1 is maximum at the blade root 1A and is gradually decreased to a tip portion 1H in a side view, and the tip portion 1H is made into a semicircle shape. The maximum thickness $t_2$ of the blade end portion is set at about one-third of the maximum thickness $t_1$ of the blade root 1A and so on, namely within a range of 30 to 35%.

An inclined portion 1C is formed by inclining the blade end portion in a direction of a front surface from the maximum chord length portion 1B on the front surface 1D.

Figure 3:
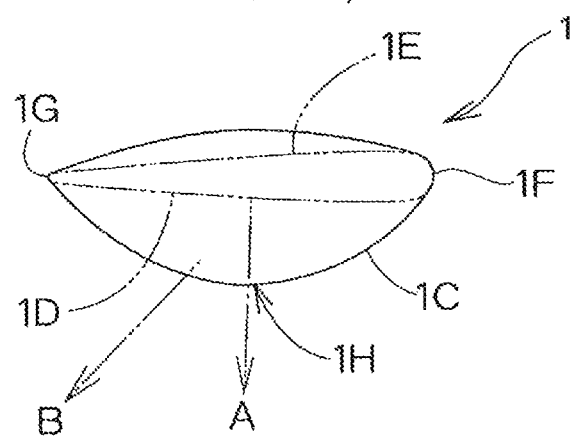
FIG. 3 is a top plan view thereof.
Figure 4:
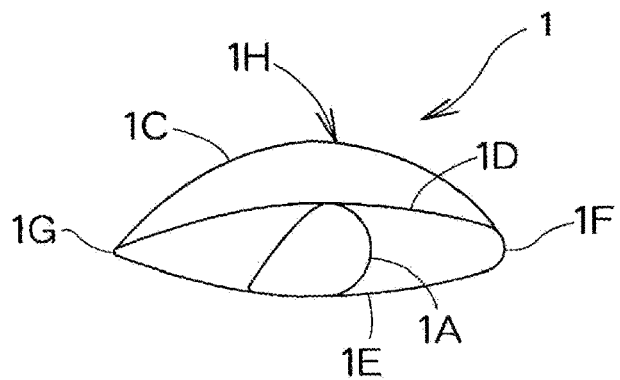
FIG. 4 is a bottom plan view thereof.

This inclined portion 1C is inclined in a direction perpendicular to the front surface 1D, wherein the direction is shown by an arrow A in FIG. 3. When an attack angle is set at 17 degrees as an example, this arrow A direction is turned by about 17 degrees to a trailing edge 1G direction.

Therefore, the airflow moving from the blade root 1A and passing through the front surface 1D of the inclined portion 1C passes through in an intermediate direction (arrow B direction) between the direction of the tip portion 1H of this inclined portion 1C (shown by an arrow A) and the direction of the trailing edge 1G in the counter-rotation direction side. Due to a counteraction, a rotation efficiency of the blade 1 is increased.

In other words, when this blade 1 rotates by receiving the airflow on the front surface 1D, the airflow does not pass through in a rotating circle of the blade 1 in the direction of the back surface 1E, and passes through in the direction of the back surface 1E of the inclined portion 1C, that is, in an oblique direction between the counter-rotation direction and a centrifugal direction as shown by an arrow C in FIGS. 1 and 2. Thus, a counteraction due to the airflow flowing in the arrow C direction in FIG. 1 is directed to an opposite direction of the flowing direction, and the blade 1 is effectively rotated in the rotation direction faster than the wind speed.

Figure 5:
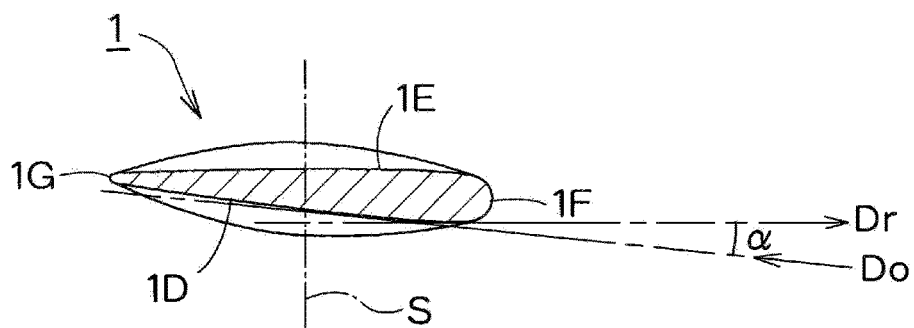
FIG. 5 is a sectional view taken along the line A-A in FIG. 1.

FIG. 5 is a sectional view taken along the line A-A in FIG. 1. This section corresponds to the maximum chord length portion 1B, a leading edge 1F is formed into a semicircle shape, a diameter of the leading edge 1F is the same as thickness of it, and this section is gradually thinned toward the trailing edge 1G.

The thickness of the blade end portion is set at about one-third of the chord length of the blade root 1A. This numerical value is balanced by a factor in which the front surface 1D is inclined by about 2 degrees in the direction of the back surface 1E.

A maximum thickness of the leading edge 1F at the maximum chord length portion 1B is set at 12% plus or minus 1% of the chord length. Since the cross section of the leading edge 1F has the semicircle shape, a relative flow flows smoothly even if the relative flow hits the leading edge 1F from whatever direction.

In this way, it is possible to reduce resistance by making the attack angle close to 0 degree even if the chord length is long, but a torque is reduced. Thus, as shown in FIG. 5, when an orientation direction Do of the front surface 1D of the maximum chord length portion 1B is inclined from the rotation direction Dr by about 5 degrees such that the trailing edge 1G is arranged in the back surface 1E direction, it is also possible to smooth a counteraction due to the passing flow in the chord direction by the Coanda effect according to the rotation and the rotation due to the wind receiving.

Figure 6:
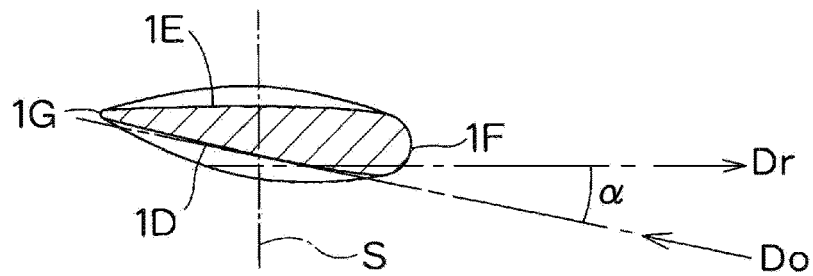
FIG. 6 is a sectional view taken along the line B-B in FIG. 1.

FIG. 6 is a sectional view taken along the line B-B in FIG. 1. The maximum thickness of the leading edge 1F is 20% plus or minus 2% of the chord length. This thickness is about one-fourth when comparing with that of the blade root 1A shown in FIG. 8. Thus, the resistance when rotating is low.

Figure 7:
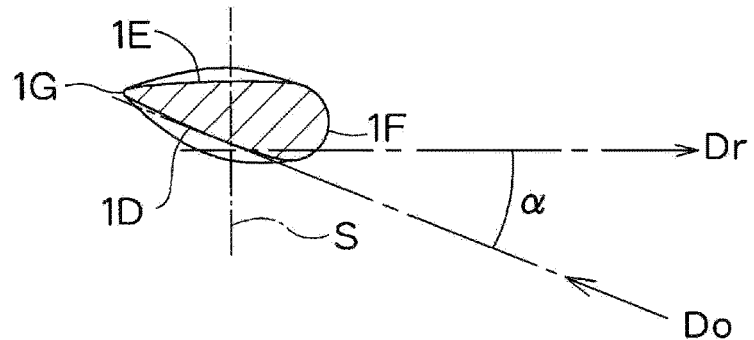
FIG. 7 is a sectional view taken along the line C-C in FIG. 1.

FIG. 7 is a sectional view taken along the line C-C in FIG. 1. The maximum thickness of the leading edge 1F is 38% plus or minus 2% of the chord length.

Thus, even if the attack angle is 0 degree, it is possible to smooth the counteraction due to the passing flow in the chord direction by the Coanda effect according to the rotation and the rotation due to the wind receiving.

Figure 8:
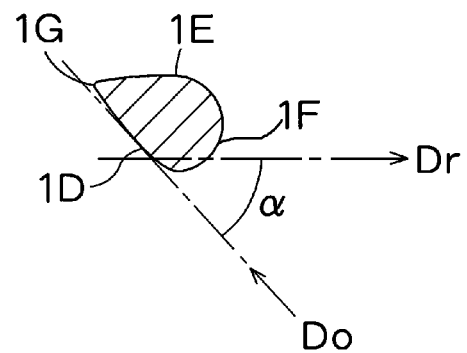
FIG. 8 is a sectional view taken along the line D-D in FIG. 1.
Figure 9:
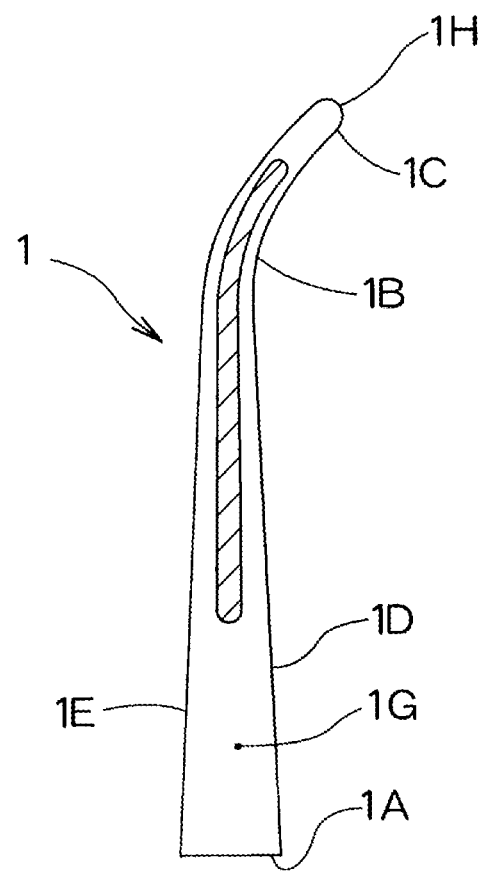
FIG. 9 is a sectional view taken along the line E-E in FIG. 1.
Figure 10:
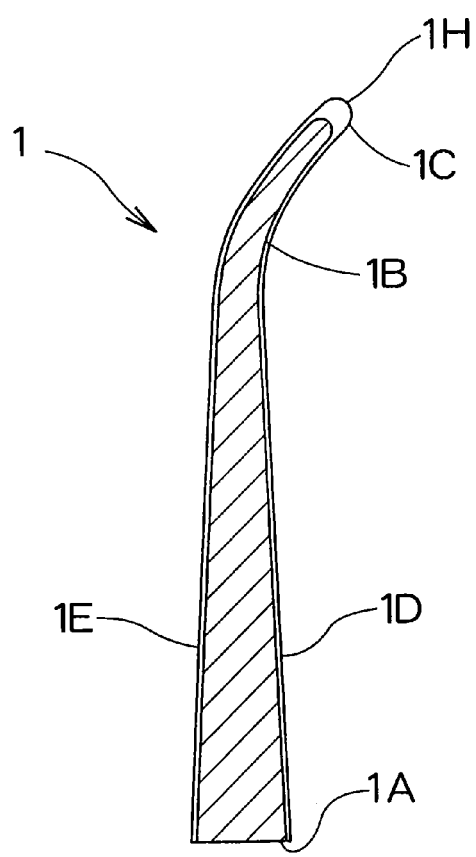
FIG. 10 is a sectional view taken along the line F-F in FIG. 1.
Figure 11:
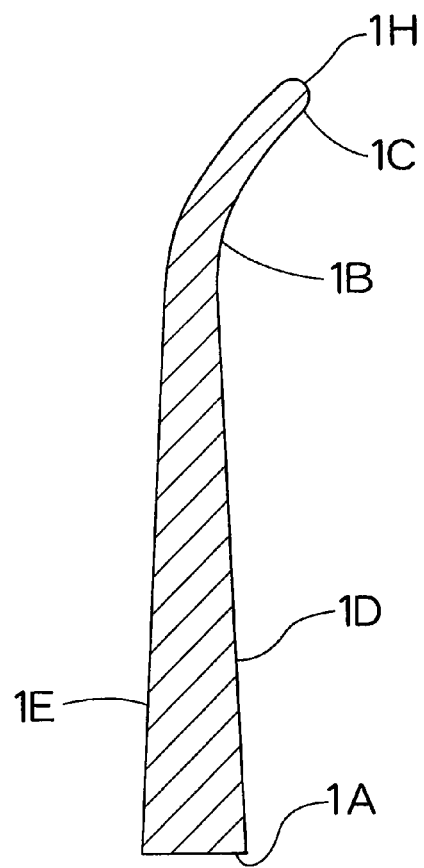
FIG. 11 is a sectional view taken along the line G-G in FIG. 1.
Figure 12:
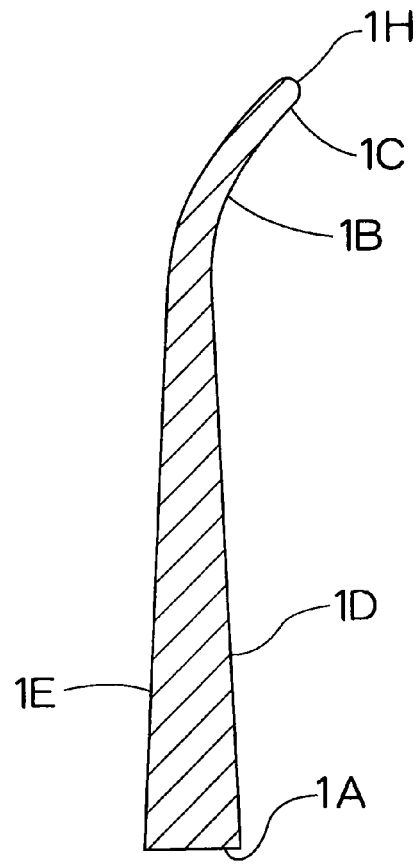
FIG. 12 is a sectional view taken along the line H-H in FIG. 1.
Figure 13:
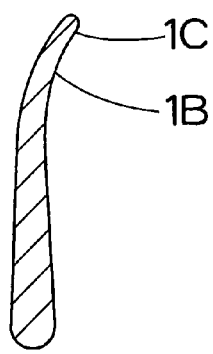
FIG. 13 is a sectional view taken along the line I-I in FIG. 1.

FIG. 8 is a sectional view taken along the line 1D-D in FIG. 1. The maximum thickness of the leading edge 1F of the blade root 1A is 75% plus or minus 2% of the chord length as shown in the drawing. The front surface 1D is inclined such that the trailing edge is arranged in the back surface 1E side compared to a forward portion of the front surface 1D).

When the chord length of the blade root 1A is large, a crossing angle α between the orientation direction Do of the front surface 1D of the blade root 1A and the rotation direction Dr is small. It is preferable that this crossing angle α between the orientation direction Do of the front surface 1D of the blade root 1A and the rotation direction Dr is 45 degrees. When the crossing angle α is less than 45 degrees, a force for pushing the blade 1 in the rotation direction by the airflow is reduced, and the torque is reduced.

In FIGS. 5 to 8, the larger the ratio of the maximum thickness of the leading edge 1F to the chord length is, the faster the flow speed by the Coanda effect occurring when rotating is.

Therefore, the flow speed passing through the front surface 1D by the Coanda effect is faster at the blade root 1A than at the blade end portion 1H.

In FIG. 1, generally, a peripheral speed is faster at the blade end portion 1H than at the blade root 1A. Thus, since the airflow passing through the peripheral surface of the maximum chord length portion 1B with a high speed due to the Coanda effect is low in an air density, the airflow is low in air pressure and draws airflows of atmospheric pressure from the surroundings.

In FIGS. 5 to 8, the thicker the maximum thickness of the leading edge 1F, the faster the flow speed of the airflow passing through the front surface 1D by the Coanda effect. Thus, a flow rate is increased proportional to the flow speed, and the torque of the blade 1 is increased due to a counteraction.

Moreover, since the high-speed flow is lower in air pressure than the surroundings, airflows in atmospheric pressure are drawn from the front side of the front surface 1D to a backward portion behind a width center line S of a chord in the direction of the trailing edge 1G in FIGS. 5 to 8, and the rotation efficiency is increased.

Simultaneously, as shown in FIG. 2, since the front surface 1D is inclined in the direction of the back surface 1E from the blade root 1A to the maximum chord length portion 1B, the airflow flowing in the centrifugal direction on the front surface 1D moves from the blade root 1A in the direction of the tip portion 1H, hits the inclined portion 1C, passes through in the arrow B direction in FIG. 3, pushes the blade 1 in the rotation direction due to the counteraction, and increases the torque.

Figure 14:
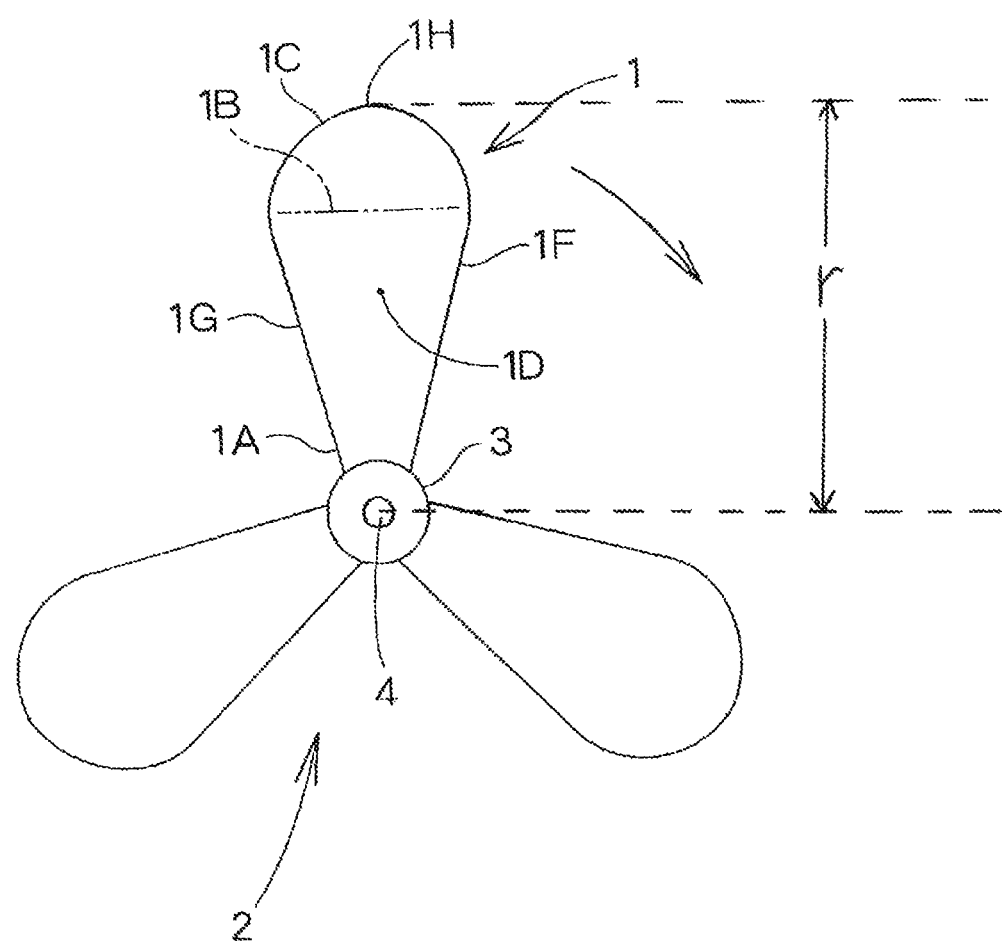
FIG. 14 is a front elevational view of a rotor to which three rotor blades of the present invention are fixed.

FIG. 14 is a front elevational view of the rotor 2 in which the blades 1 are fixed to a hub 3. The blades 1 are fixed to the hub 3 such that each attack angle at the respective maximum chord length portions 1B is set at 0 degree.

Conventionally, since the blade is twisted such that the attack angle is increased toward the blade end portion 1H, cavitation occurs at the blade root 1A close to the hub 3 when rotating at a high speed.

In the present invention, although a twist is not seen in a side view as shown in FIG. 2, the front surface 1D is gradually inclined in the direction of the back surface 1E by about 2 degrees from the blade root 1A to the maximum chord length portion 1B on the drawing by thinning the blade end portion 1H compared to the blade root 1A. Thus, the airflow easily moves from the blade root 1A in the direction of the maximum chord length portion 1B.

Moreover, since the blade end portion is thinned compared to the blade root 1A, as shown in FIGS. 5 to 8, the trailing edge 1G is positioned at the back surface 1E side at the blade root 1A. The closer the position of the trailing edge 1G gets to the maximum chord length portion 1B, the more the position of the trailing edge 1G is shifted in the direction of the front surface 1D.

In other words, a forward portion before the width center line S of the chord on the front surface 1D is inclined in the direction of the back surface 1E from the blade root 1A to the tip portion 1H side, and a backward portion behind the width center line S of the chord is gradually shifted in the direction of the front surface 1D from the blade root 1A to the tip portion 1H side.

Thus, at a portion near the trailing edge 1G on the chord, the closer the airflow moving from the blade root 1A in the direction of the maximum chord length portion 1B when rotating gets to the maximum chord length portion 1B, the more the airflow is shifted in the direction of the front surface.

As a result, the closer the airflow hitting the front surface 1D of the blade 1 gets to the maximum chord length portion 1B from the blade root 1A, the more the airflow is increased in a wind pressure. The inclined portion 1C is pressed by a strong wind power, and a rotational torque with an excellent efficiency can be obtained by a principle of leverage.

Figure 15:
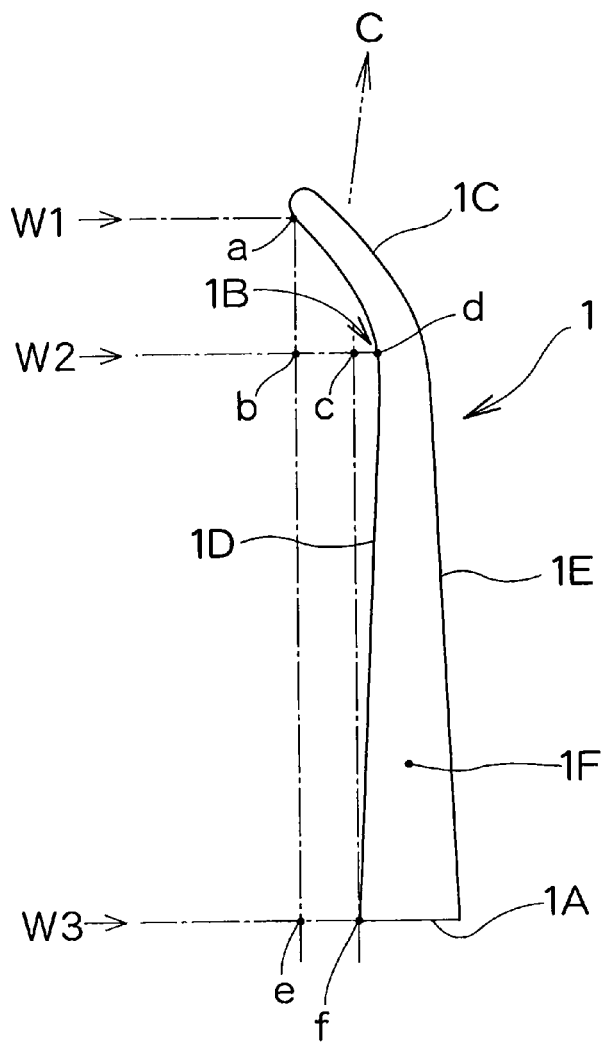
FIG. 15 is a side elevational view of a rotor blade showing variation of airflows.

In FIG. 15, it is explained a relation between the inclination of the whole front surface 1D and each change of the airflows by the inclined portion 1C. In FIG. 15, each airflow shown by arrows W1, W2, W3 reaches respective points a, b, e from a left side simultaneously.

A time in which the airflow shown by the arrow W2 reaches from the point b to the point d is the same as that in which the airflow shown by the arrow W1 reaches from the point a to the point d. Therefore, a speed in which the airflow W1 reaches from the point a to the point d is faster than that in which the airflow W2 reaches from the point b to the point d, and an air pressure is decreased according to the speed difference.

The time in which the airflow shown by the arrow W2 reaches from the point b to the point d is the same as that in which the airflow shown by the arrow W3 reaches from the point e to the point f. Then, a time in which the airflow shown by the arrow W2 reaches from the point c to the point d is the same as that in which the airflow shown by the arrow W3 reaches from the point f to the point d. Therefore, an airflow between the points f and d is in a high speed and is in a low pressure.

Accordingly, as a result that the front surface 1D of the blade 1 is inclined in the direction of the back surface 1E toward the maximum chord length portion 1B, it is possible to understand that the high-speed flow occurs between the points f to d, and that the airflows of low pressure concentrate on the maximum chord length portion 1B.

When the low air pressure occurs, airflows of atmospheric pressure surge from the surroundings and pass through in a high speed in the arrow C direction shown in FIG. 2 and in the arrow B direction shown in FIG. 3, and the high-speed rotation of the blade 1 is accelerated in a high efficiency due to a counteraction.

In this way, the blade of the present invention has a unique structure such as that the maximum chord length is 300% plus or minus 10% of the chord length of the blade root 1A, that the thickness of the blade end portion 1H is about one-third of that of the blade root 1A in a side view, that the front surface 1D is inclined in the direction of the back surface 1E from the blade root 1A to the maximum chord length portion 1B, and that the trailing edge 1G in the backward portion behind the width center line S of the chord is gradually shifted in the direction of the front surface 1D from the blade root 1A to the maximum chord length portion 1B. A total efficiency of these features accelerates the effect of rotation in the high efficiency.

The blade 1 comprises the maximum chord length portion 1B which has a large chord length, a large wind receiving area and thickness smaller than that of a blade root 1A, and the blade 1 has a high rotation efficiency. Therefore, the blade 1 can be applied to a wind power generation system and a high generating efficiency can be obtained.

What is claimed is:

1. A lift type rotor blade which has a chord length gradually increased from a blade root to a maximum chord length portion, the maximum chord length portion is a base portion of a blade end portion, the lift type rotor blade comprising:
    a leading edge that faces a direction of rotation and extends from the blade root to a tip portion of the blade end portion, and, in a side view, the leading edge has a thickness that is greatest at the blade root and gradually and continuously decreases from the blade root to the tip portion;
    a front surface gradually inclined in a direction of a back surface from the blade root to the maximum chord length portion such that an interval between the front and back surfaces is continuously decreased from the blade root to the maximum chord length portion in the side view; and
    an inclined portion formed on the blade end portion which is inclined in a front surface direction from the maximum chord length portion,
    wherein the back surface is gradually inclined in a direction toward the front surface from the blade root to the maximum chord length portion according to the continuous decrease of the interval between the front and back surfaces from the blade root to the maximum chord length portion in the side view,
    wherein the front surface extends from the leading edge to a trailing edge of the rotor blade, the trailing edge being positioned behind the leading edge in the direction of rotation, the front surface is oriented, at the blade root, in an oblique direction relative to the direction of rotation such that, from the leading edge to the trailing edge, the front surface is angled toward the back surface, and from the blade root to the maximum chord length portion, a crossing angle of an orientation direction of the front surface relative to the direction of rotation gradually decreases, and
    wherein when the lift type rotor blade fixed to a hub of a rotor rotates, an airflow is directed from the blade root to the maximum chord length portion at where an air pressure is decreased.

2. The lift type rotor blade according to claim 1, wherein the chord length of the maximum chord length portion is 300% plus or minus 10% of the chord length of the blade root, the inclined portion is inclined in the direction of the front surface from a front surface of the maximum chord length portion, and when the lift type rotor blade fixed to the hub of the rotor rotates, airflows are gathered at the blade root due to a difference among high-speed flows on the front surface by a Coanda effect, and are naturally directed to the inclined portion.

3. The lift type rotor blade according to claim 1, wherein the lift type rotor blade is fixed to the hub of the rotor at an attack angle of 0 degree at the maximum chord length portion.

4. The lift type rotor blade according to claim 2, wherein the lift type rotor blade is fixed to the hub of the rotor at an attack angle of 0 degree at the maximum chord length portion.

5. The lift type rotor blade according to claim 1, wherein the chord length of the maximum chord length portion is within a range of 40 to 50% of a rotation radius of the lift type rotor blade, the chord length of the blade root on the front surface is within a range of 30 to 35% of the chord length of the maximum chord length portion, a maximum thickness in a side surface of the blade root is within a range of 75% plus or minus 2% of the chord length of the blade root, and a maximum thickness of the blade end portion is within a range of 30 to 35% of the maximum thickness of the blade root.

6. The lift type rotor blade according to claim 2, wherein the chord length of the maximum chord length portion is within a range of 40 to 50% of a rotation radius of the lift type rotor blade, the chord length of the blade root on the front surface is within a range of 30 to 35% of the chord length of the maximum chord length portion, a maximum thickness in a side surface of the blade root is within a range of 75% plus or minus 2% of the chord length of the blade root, and a maximum thickness of the blade end portion is within a range of 30 to 35% of the maximum thickness of the blade root.

7. The lift type rotor blade according to claim 3, wherein the chord length of the maximum chord length portion is within a range of 40 to 50% of a rotation radius of the lift type rotor blade, the chord length of the blade root on the front surface is within a range of 30 to 35% of the chord length of the maximum chord length portion, a maximum thickness in a side surface of the blade root is within a range of 75% plus or minus 2% of the chord length of the blade root, and a thickness of the blade end portion is within a range of 30 to 35% of the thickness of the blade root.

8. The lift type rotor blade according to claim 1, wherein the leading edge is formed into a semicircle shape in a cross section in at least at the maximum chord length portion, and the thickness of the leading edge is the same as a diameter of the semicircle-shaped leading edge.

9. The lift type rotor blade according to claim 8, wherein the maximum thickness of the leading edge at the maximum chord length portion is set at 12% plus or minus 1% of the chord length of the maximum chord length portion.

* * * * *